(12) United States Patent
Fiedler et al.

(10) Patent No.: US 7,340,368 B2
(45) Date of Patent: Mar. 4, 2008

(54) DETERMINATION OF DYNAMIC AXLE LOADS AND/OR WHEEL LOADS OF A WHEEL VEHICLE

(75) Inventors: Jens Fiedler, Thalmassing (DE); Andreas Mayer, Regensburg (DE); Thomas Schweiger, Wörth (DE); Martin Stratesteffen, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/596,363

(22) PCT Filed: Nov. 24, 2004

(86) PCT No.: PCT/EP2004/053080

§ 371 (c)(1), (2), (4) Date: Jun. 9, 2006

(87) PCT Pub. No.: WO2005/056358

PCT Pub. Date: Jun. 23, 2005

(65) Prior Publication Data

US 2007/0078593 A1    Apr. 5, 2007

(30) Foreign Application Priority Data

Dec. 12, 2003    (DE) .............................. 103 58 335

(51) Int. Cl.
*G01P 3/00* (2006.01)
*G06F 15/00* (2006.01)

(52) U.S. Cl. ...................... 702/145; 702/142

(58) Field of Classification Search ............... 702/127, 702/141, 142, 148, 145, 124, 182; 701/69, 701/70, 72; 180/197, 199
See application file for complete search history.

(56) References Cited

U.S. PATENT DOCUMENTS

| | | | |
|---|---|---|---|
| 5,086,656 A | 2/1992 | Schwendemann et al. | 73/862.54 |
| 5,501,111 A * | 3/1996 | Sonderegger et al. | 73/862.642 |
| 6,141,604 A | 10/2000 | Mattes et al. | 701/1 |
| 6,593,849 B2 * | 7/2003 | Chubb et al. | 340/446 |
| 2002/0056582 A1 | 5/2002 | Chubb et al. | 180/197 |
| 2002/0183914 A1 * | 12/2002 | Wetzel et al. | 701/72 |
| 2005/0182548 A1 | 8/2005 | Bernzen et al. | 701/70 |

FOREIGN PATENT DOCUMENTS

| | | |
|---|---|---|
| DE | 3912144 A1 | 10/1990 |
| EP | 0691530 | 7/1995 |
| EP | 1002709 | 10/1999 |
| EP | 1147929 A1 | 10/2001 |
| WO | 03/076228 A1 | 9/2003 |

* cited by examiner

*Primary Examiner*—Bryan Bui
(74) *Attorney, Agent, or Firm*—Baker Botts L.L.P.

(57) ABSTRACT

For determination of dynamic axle and/or wheel loads of a wheel vehicle (20), wherein for said wheel vehicle (20), at least two linear transversally oriented with respect to each other accelerations and three rotation rates of a rotation movement around the coordinate axis of the vehicle (20) or of the component of the coordinate axis are respectively measured by a measuring device (1). The three coordinate axes extend transversally with respect to each other and at least one axle load and/or wheel load of the wheel vehicle (20) are determined by means of at least two linear accelerations and three rotation rates with the aid of evaluation device (9).

20 Claims, 3 Drawing Sheets

DETERMINATION OF DYNAMIC AXLE LOADS AND/OR WHEEL LOADS OF A WHEEL VEHICLE

CROSS-REFERENCE TO RELATED APPLICATIONS

This application is a U.S. national stage application of International Application No. PCT/EP2004/053080 filed Nov. 24, 2004, which designates the United States of America, and claims priority to German application number DE 103 58 335.1 filed Dec. 12, 2003, the contents of which are hereby incorporated by reference in their entirety.

TECHNICAL FIELD

The invention relates to an arrangement and a method for the determination of the dynamic axle loads and/or the wheel loads of a wheel vehicle.

Axle loads and wheel loads, i.e. forces acting on a running gear or on the parts of a running gear are input variables for the electronic control systems of motor vehicles, for example, for an anti-lock brake system (ABS) and for a system in order to actively control the running gear or the coupling of the running gear with a vehicle structure (for example, the so-called electronic stability program ESP). Additional examples include a protective system protecting a motor vehicle against rolling over (rollover protection) and systems for stabilizing rocking motions in passenger cars and in utility vehicles as well as in trailers.

The invention more particularly relates to a connection of the arrangement to at least one such system or to any combination of such systems.

BACKGROUND

A circuit arrangement for determining the axle loads in the case of a motor vehicle is known from DE 196 03 430 A1. The signals of a rotating speed sensor are received in an evaluation circuit, said signals reproducing a pitching motion of the motor vehicle and the axle loads and/or the wheel contact forces of the motor vehicle are calculated from said signals. More particularly, both the angular velocity in the longitudinal direction of the motor vehicle up to the angle of pitch and the angular velocity in the transverse direction of the motor vehicle up to the roll angle are integrated in a control computer. The axle load or weight distribution between the front and the rear axles can be calculated from the angle of pitch, the roll angle, the rise of site or slope, the left and the right wheelbase, the front and rear track as well as the road speed of the motor vehicle.

SUMMARY

It is the object of the invention to specify an arrangement and a method which allow a determination of the dynamic axle loads and/or the wheel loads of a wheel vehicle in a plurality of real driving situations. More particularly, it should be possible to determine the axle loads and/or the wheel loads especially in safety-critical situations such as when cornering, in the case of a suitable driving surface and/or in the case of a rolling vehicle structure.

In order to determine the dynamic axle loads and/or the wheel loads of a wheel vehicle, it is proposed to measure at least two (preferably three) linear accelerations of a wheel vehicle oriented transversally with respect to each other and three rotation rates of the wheel vehicle. In each case, the three rotation rates are a measurement of a rotation movement or of the components of a rotation movement around a coordinate axis of the wheel vehicle, in which case the said two or three coordinate axes extend transversally with respect to each other and, in particular, form a Cartesian coordinate system.

An arrangement may comprise:
 a measuring device arranged in the wheel vehicle or which can be arranged in the wheel vehicle, in which case the said measuring device has been developed in such a way that it can measure at least two linear accelerations of a wheel vehicle oriented transversally with respect to each other and three rotation rates of a rotation movement or of a component of a rotation movement around a coordinate axis of the wheel vehicle in each case, in which case the said three coordinate axes extend transversally with respect to each other, and
 an evaluation device which has been connected to and developed with the measuring device and at least one axle load and/or one wheel load, is determined by means of at least two linear accelerations and three rotation rates with the aid of said evaluation device.

In this case, the term "axle" does not only mean a rigid axle and/or an axle embodied as an individual, objectively present component. The wheels of an axle can rather, for example, simply be connected to each other by means of a vehicle structure as well as by means of shock absorber devices and/or suspension devices arranged between the vehicle structure and the specific wheel. In addition, it is also possible for at least one of the axles only to have one wheel.

An axle load means a load which altogether acts on the wheels of an axle (for example from a vehicle structure on the front wheels of a four-wheeled vehicle) or is exerted (for example at the wheel contact points) from the wheels of the axle on the subsurface. A wheel load means a load which acts on an individual wheel of the motor vehicle (for example from a vehicle structure on the right front wheel of a four-wheeled vehicle) or on a plurality of wheels of the motor vehicle (for example on the two right wheels of a four-wheeled vehicle) or is exerted from the wheel or the wheels on the subsurface.

The measuring device preferably has acceleration sensors in order to measure the two (or three) linear accelerations and rotation rate sensors to measure the three rotation rates, in which case the said acceleration sensors and rotation rate sensors are parts of a prefabricated unit embodied in accordance with equipment engineering so that they can be installed in the wheel vehicle. This unit is a special embodiment of a so-called Inertial Measurement Unit (IMU). The IMU is intended for example to be fitted to or in the proximity of the center of gravity of a wheel vehicle. The center of gravity of the wheel vehicle or of a vehicle structure of the wheel vehicle is then preferably within the unit.

In addition, preference is given to the fact that by using a measuring device it is possible to measure the two (or three) linear accelerations as linear measured quantities, which do not depend on each other. Preferably, the directions of the accelerations or the components of the accelerations recorded by the acceleration sensors in each case form the axes of a three-dimensional right-angle coordinate system.

Accordingly the same is preferred for the adjustment of the three coordinate axes with regard to which the components of the rotation vector of a rotation movement of the vehicle is measured. In other words: The measuring device is embodied in such a way that the three coordinate axes extend vertically with respect to each other in pairs.

The measuring device can for example have a separate sensor for each measured quantity. However, there are also sensors which measure two of the measured quantities mentioned at the same time (for example, two accelerations or two rotation rates).

In order to measure the rotation rates and to measure the linear accelerations, the measuring sensors of the measuring device are preferably fitted to a vehicle structure moving relative to a running gear of the motor vehicle.

Acceleration sensors measure, depending on the orientation of the vehicle, a measured quantity influenced by the gravitational force. When the motor vehicle is standing still, the acceleration sensor only measures the effects of the gravitational force. The actual acceleration does not then occur in the measured quantity.

In this description, the dynamic acceleration quantity changed by the gravitational force is called the effective acceleration quantity. Preferably, in the case of the determination of the dynamic axle loads and/or the wheel loads, the effective acceleration values are used. Dynamic loads are then obtained which contain the static load (the part of the gravitational pull of the earth or the force of gravity). However, if required it is also possible to determine the pure dynamic load, for example, by integrating the three rotation rates in order to determine the orientation of the motor vehicle relative to a globally-fixed coordinate system and by eliminating the static part by using information about the orientation.

For this purpose especially the arrangement can have a device for determining an orientation which has been embodied in such a way that it is possible to determine, from the three rotation rates, an orientation of the wheel vehicle in a vehicle-external coordinate system. In addition, in order to be able to monitor the quantities measured by the measuring device for possible errors, a monitoring device is proposed which has been embodied in such a way that, by using an output quantity of the device for determining an orientation and by using a comparison quantity, it is possible to carry out a monitoring process of at least one of the measured linear accelerations. In order to determine the comparison quantity, additional quantities not measured by the measuring device are used in particular, for example, a steering angle of at least one steerable wheel of the vehicle and/or a road speed. Should it be determined on carrying out the monitoring process that a measured value of the measuring device, is not reliable for example because of a sensor error, suitable measures can be taken.

By taking into account the three rotation rates and the at least two accelerations of the vehicle, it is possible even in safety-critical driving situations, in particular if high accelerations and/or quick rotation movements of the vehicle take place, to calculate reliably an axle load and/or at least a wheel load. Examples of driving situations in which previously known methods for the calculation of the load cannot be used or can only be used in a restricted manner, relate to cornering, driving on cambered subsurfaces and/or driving in the case of sideways rotation movements of a vehicle structure (in the case of a tilting vehicle structure).

In a computer model in order to calculate the load, which has been implemented in the evaluation device, it is possible on the basis of the rotation rates and the accelerations to take into account for example one term or a plurality of terms about which no measured information had previously been made available. These include:

Terms which take into account loads on the basis of a movement of the vehicle and/or a vehicle structure transversally to the plane of the subsurface, Terms which take into account a relative movement between a vehicle structure and a running gear of the vehicle, and/or Terms which take into account a moment of inertia of the motor vehicle and/or a part of the vehicle (in particular a vehicle structure) in the case of a rotation movement.

In addition, terms can be taken into account in the computer model, which take into account an (in particular damped) elastic movement behavior of a vehicle structure relative to a running gear. This is explained in detail below.

More particularly, the evaluation device can have a computation unit, which has been embodied, that by using a measured value measured by the measuring device for a linear acceleration oriented transversally to the plane of a vehicle subsurface at least one part of the axle load and/or a part of the wheel load is calculated;

that by using the three rotation rates at least one part of the axle load and/or a part of the wheel load is calculated which is generated by a rotation movement of the wheel vehicle and/or by a rotation movement of a part of the wheel vehicle; and/or that with due consideration of a, in particular damped, suspension between at least one of the wheels of the wheel vehicle and a vehicle structure, the axle load and/or the wheel load is calculated.

The Computation Unit for Example has a Microprocessor.

The method in accordance with the invention in addition allows a reliable prognosis of a driving situation in which case by using at least two axle loads and/or wheel loads calculated in accordance with the method, it is possible to forecast whether or not a wheel of the wheel vehicle or a plurality of wheels of the wheel vehicle will lose roadholding and thus the grip to a subsurface. For example, the loads for the different wheels of a vehicle are considered as functions of time and these functions are repeatedly extrapolated, so that at least a future value of the loads is obtained in each case. By way of comparison and/or by using the extrapolated loads it is then possible to determine for a future point in time, whether or not the roadholding and thus the grip to the subsurface will be lost. For example, in such a case, a system actively to control the running gear or the coupling of the running gear with a vehicle structure makes it possible that suitable measures are taken in order to avoid such a hazardous situation. For example, it is possible to apply the brakes to single wheels or to a plurality of wheels of the motor vehicle.

BRIEF DESCRIPTION OF THE DRAWINGS

The invention is now explained in detail on the basis of the embodiments. Reference is made in the explanation to the included, schematic drawing and a preferred embodiment is described. The same reference symbols in the drawing designate the same units or devices as well as functionally equal and equivalent units or devices. The individual figures of the drawing are as follows.

DETAILED DESCRIPTION

Figure 1:
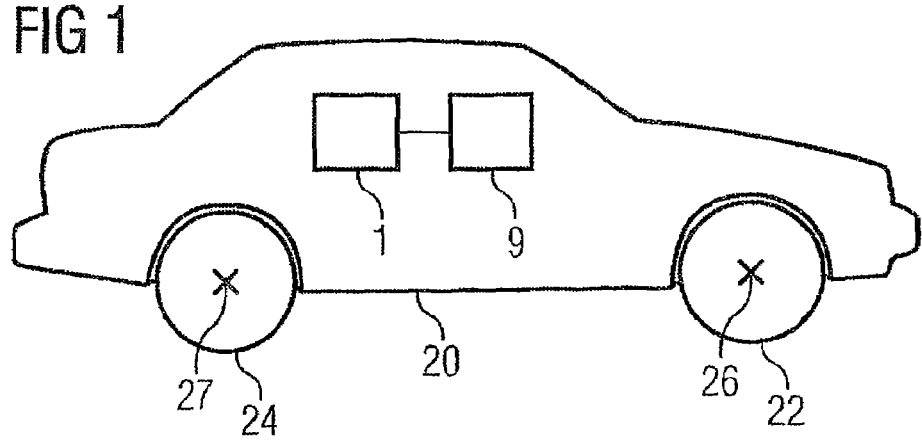
FIG. 1 a road motor vehicle with an arrangement for the determination of the dynamic axle loads and the wheel loads, FIG. 2 an embodiment of the evaluation device shown in FIG. 1 in connection with a measuring device, FIG. 3 the measuring device shown in FIG. 1 in a common housing with the evaluation device, FIG. 4 side view of a model of a road motor vehicle with a running gear and with a vehicle structure connected to the running gear via a damped suspension, FIG. 5 front view of the model in accordance with FIG. 4, FIG. 6 a representation of a road motor vehicle in order to explain the dimensions and the angles and FIG. 7 an example of an embodiment of the measuring device shown in FIG. 1.

The road motor vehicle 20 shown in FIG. 1 has two front wheels and two rear wheels, in the case of which the right front wheel has been designated with the reference symbol 22 and the right rear wheel with the reference symbol 24. A front axle 26 has been allocated to the front wheels. A rear axle 27 has been allocated to the rear wheels. The wheels allocated to an axle rotate coaxially for straight-ahead driving of the road motor vehicle 20, i.e. they have a common rotational axis.

A measuring device 1 has been arranged in the road motor vehicle 20, said measuring device being connected to an evaluation device 9 for the determination of the axle loads and the wheel loads of the road motor vehicle 20.

Figure 7:
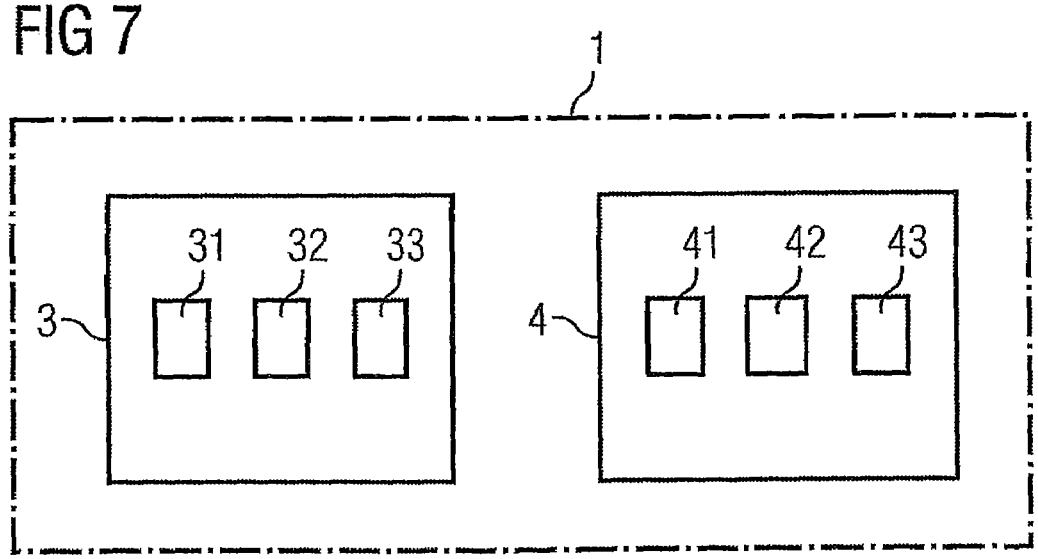

As shown in FIG. 7, the measuring device 1 for example has an acceleration measuring device 3 and a rotation rate measuring device 4. More particularly, the measuring device 1 is a prefabricated constructional unit, in which case the said corresponding measuring sensors for measuring the accelerations and the rotation rates have been arranged relative to each other in the unit with fixed positions. More particularly, the constructional unit has been designed in such a way that it can be fitted to or in the proximity of the center of gravity of a motor vehicle, in which case a specific alignment in the motor vehicle is aimed at in each case.

More particularly, the acceleration measuring device 3 has three linear acceleration sensors 31, 32, 33 (FIG. 7) which have been arranged in such a way that in each case one of the acceleration sensors measures an acceleration or the acceleration components of the motor vehicle in the direction of the axes of a Cartesian coordinate system, in which case the x axis extends towards the front in the longitudinal direction of the motor vehicle, the y axis is oriented transversally to the longitudinal axis and the z axis (in the case of a horizontally aligned motor vehicle) extends vertically upwards. Such a coordinate system is shown schematically in FIG. 6. Said figure shows a road motor vehicle 20 with two steerable front wheels 21, 22 and two non-steerable rear wheels 23, 24. In the shown state, the front wheels have been turned towards the left and have a steering angle $\delta_L$ (left front wheel 21) or $\delta_R$ (right front wheel 22) to the x axis. The front wheels 21, 22 have a distance (wheelbase) of $s_F$ from each other and the rear wheels 23, 24 a distance of $s_R$ from one another. $r_R$ designates the radius of the rear wheels 23, 24. The measuring device 1 is more or less arranged in the center of a vehicle structure 25 in a longitudinal direction. In the longitudinal direction, it is at a distance of $l_F$ from the axle of the front wheels 21, 22 and at a distance of $l_R$ from the axle of the rear wheels 23, 24.

The invention is not restricted to wheel vehicles with front wheel steering. On the contrary, it is in addition also possible for the rear wheels to be steerable.

Figure 2:
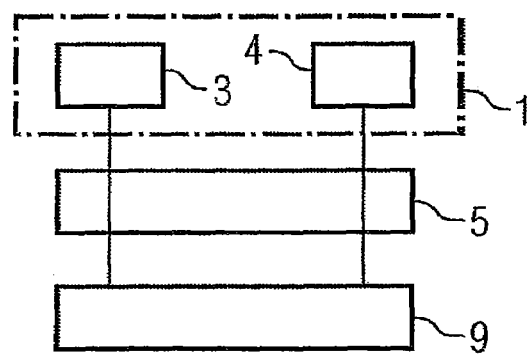

An embodiment for the arrangement shown in FIG. 1 is given in FIG. 2. The acceleration measuring device 3 is connected to the evaluation device 9 via a filter device 5. The rotation rate measuring device 4 is likewise connected to the evaluation device 9 via the filter device 5.

Figure 3:
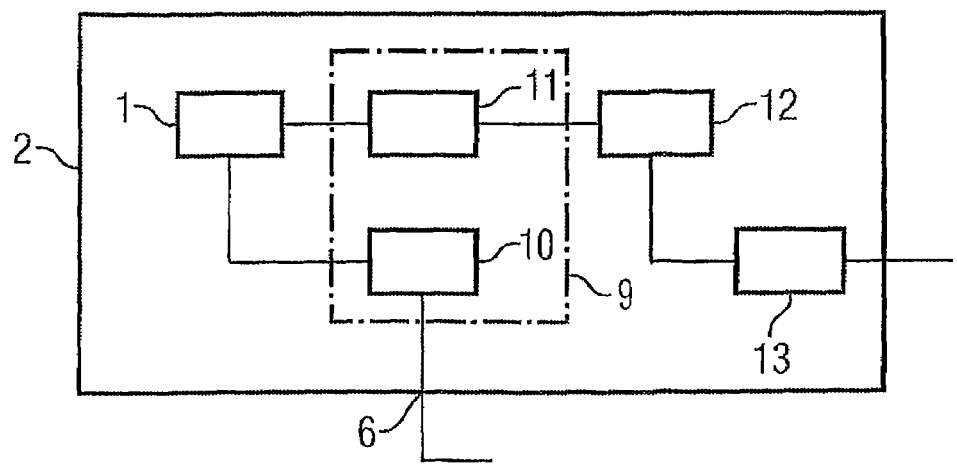

The filter device 5, which is shown in FIG. 2, acts as a substitute for additional filter devices, which can in addition be provided in the case of arrangements shown in FIGS. 1 to 3 or for modified arrangements. The filtering of the measuring signals, which is carried out by the filter devices, and/or hence the derived signals, in particular, serve the elimination of possibly occurring noises and the elimination of high-frequency fluctuations of the measuring signals, for example on the basis of vibrations of the vehicle structure. More particularly, the filter devices can have at least one lowpass filter and/or at least one bandpass filter.

The filter device 5 filters the acceleration signals measured by the acceleration measuring sensors of the acceleration measuring device 3 and the rotation rate signals measured by the rotation rate measuring sensors of the rotation rate measuring device 4 before said signals are transmitted to the evaluation device 9.

As can be seen in FIG. 3, both the measuring device 1 and the evaluation device 9 can be arranged jointly with other units and/or devices in a common housing 2. As can be seen in the figure, the evaluation device 9 can have a computation unit 11 and a monitoring device 10. The computation unit 11 serves to calculate the axle loads and/or the wheel loads of the motor vehicle. The monitoring device 10 serves to monitor the measuring signals generated by the measuring device 1.

By using the measuring signals of a steering angle and the road speed of a motor vehicle, which is received via an input 6, the monitoring device 10 carries out a monitoring procedure of at least one of the quantities measured by the measuring device 1. For example, in order to monitor the linear accelerations, the monitoring device 10 uses at least two angles (the roll angle and the angle of pitch of the motor vehicle obtained by the integration of the rotation rates) which serve as a measure for the orientation of the motor vehicle in an earth-fixed coordinate system. In this way, said device can take into account that the measured linear accelerations, depending on the orientation of the motor vehicle relative to the earth-fixed coordinate system contain a component, which must be ascribed to the gravitational pull of the earth.

In the same way as has just been shown in FIG. 3, the computation unit 11 can be connected to an extrapolation unit 12 in order to be able to predict (as has already been explained) a future driving situation in which at least one of the wheels of the motor vehicle no longer maintains its roadholding and thus grip to the subsurface is lost or no longer maintains said roadholding in a sufficient way. Via an interface 13, which is connected to an extrapolation unit 12, corresponding information about such a driving situation can be output to a system, which initiates suitable measures for the prevention of such a hazardous situation (e.g. rollover protection).

Below, the calculation of the axle loads and/or the wheel loads, which is for example carried out by the computation unit 11 is explained in detail.

Figure 6:
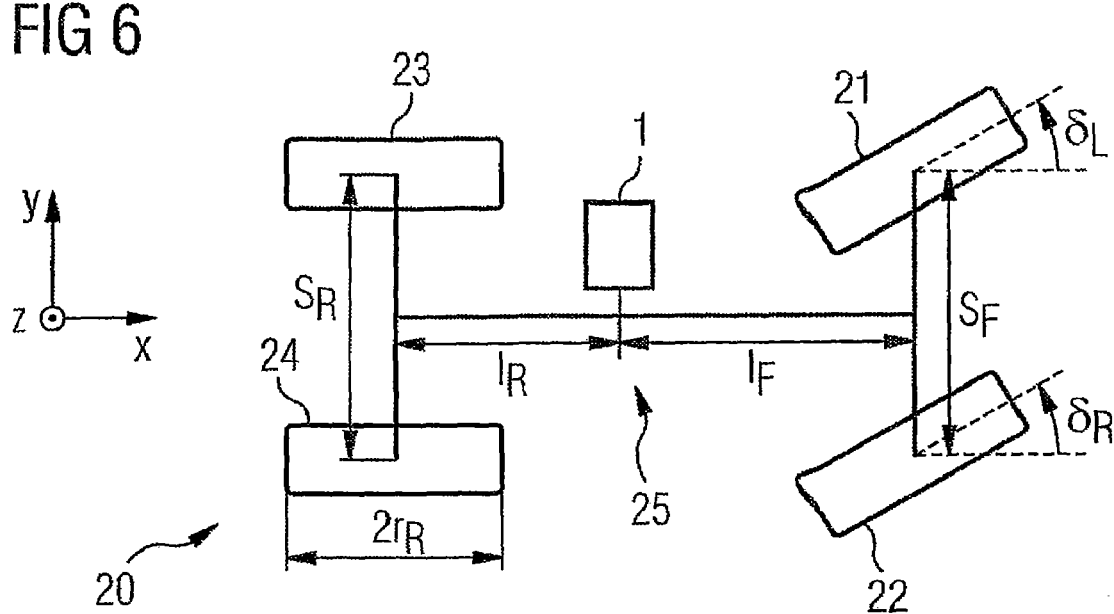

In the case of a first calculation type, the sum totals of a plurality of wheel loads should be calculated in each case, wherein in all cases either all the wheels of an axle or all the wheels of one side of the motor vehicle have been included. For example, in the case of a four-wheeled wheel vehicle it is possible to calculate in this way the load of the front axle, the load of the rear axle, the sum of the wheel loads of the right wheels and/or the sum of the wheel loads of the left wheels. For each of these calculations, only two of the acceleration quantities measured by the measuring device are needed in each case. In all cases, the linear acceleration in the z direction also belongs to these two acceleration quantities (FIG. 6).

The size of the second acceleration quantity depends on the sum to be calculated. Should it be necessary to calculate an axle load (sum of the wheels of an axle), the acceleration in the x direction is used as the second linear acceleration quantity. Should it be necessary to calculate the sum of the wheel loads on one side of the motor vehicle, the acceleration in the y direction is used as the second acceleration quantity.

In addition, in the case of each of these sum totals of wheel loads, a term describing the inertia of the motor vehicle in the case of a rotation movement is taken into account. For this term, all three rotation rates measured by the measuring device are preferably used.

Below, examples of the calculation of such sum totals of the wheel loads are explained in detail based on the physical motor vehicle models.

In the case of a first model, the motor vehicle is regarded as a rigid body, i.e. terms, which map a (in particular damped) suspension between the wheels and a vehicle structure, are not taken into account.

The dynamic load of the front axle $F_F$ is defined as the sum of the contact forces of the front wheels and the dynamic load of the rear axle $F_R$ as the sum of the contact forces of the rear wheels. More particularly, the forces can be calculated in accordance with the following equations:

$$F_F = (l_R m_V a_{CG,z}^{(e)} - h_{CG} m_V a_{CG,x}^{(e)} - J_{CG,y})/(l_R + l_F)$$

$$F_R = (l_F m_V a_{CG,z}^{(e)} + h_{CG} m_V a_{CG,x}^{(e)} + J_{CG,y})/(l_R + l_F)$$

In this case, $a_{CG,j}^{(e)}$, j=x,y,z are the measuring signals for the linear acceleration determined by the measuring device and in particular prepared by filtering and/or additional measures under the assumption that the measuring device has been arranged at and fitted to the center of gravity of the motor vehicle. Should this not be the case, the measured values are converted to the center of gravity. In addition, $l_R$ or $l_F$ are the distances—which have already been introduced with reference to FIG. 6—between the measuring device and the load of the rear axle or the load of the front axle, $m_V$ the mass of the motor vehicle, $h_{CG}$ the height of the center of gravity above the subsurface of the motor vehicle and $J_{CG,x}$, $J_{CG,y}$ the x components or the y components of the vector $$\vec{J}_{CG} = \vec{J}_{CG}\dot{\vec{\omega}} + \vec{\omega} \times (\vec{J}_{CG}\vec{\omega})$$

In this case, $\vec{J}_{CG}$ is the inertia sensor of the motor vehicle with regard to the center of gravity, in which case the coordinate axes have been oriented in the direction of the measuring directions of the sensors. $\vec{\omega}$ is the rotation vector of the motor vehicle. Assuming that the rotation vector in good approximation is diagonal, the following is obtained for the two first components of the vector $\vec{J}_{CG}$:

$$J_{CG,x} = I_{CG,1}\dot{\omega}_x + (I_{CG,3} - I_{CG,2})\omega_y\omega_z$$

$$J_{CG,y} = I_{CG,2}\dot{\omega}_y + (I_{CG,1} - I_{CG,3})\omega_x\omega_z$$

with the main moment of inertia of the motor vehicle $I_{CG,1}, I_{CG,2}, I_{CG,3}$ (diagonal elements of the 3×3 moment of inertia matrix) and the components of the rotation vector $\omega_x, \omega_y, \omega_z$.

In a corresponding manner, it is possible to obtain an equation for the sum of the wheel loads $F_{FL} + F_{RL}$ (the first index F stands for "Front", the first index R stands for "Rear", the second index L stands for "left") of the left wheels:

$$F_{FL} + F_{RL} = \frac{1}{2}m_V a_{CG,z}^{(e)} - \frac{h_{CG}}{s_F}h_{CG}m_V a_{CG,y}^{(e)} + (J_{CG,x}/s_F)$$

In this case, $S_F$ is the wheelbase, which is assumed to be equal in size for the front wheels and for the rear wheels of a motor vehicle. It is possible to obtain the corresponding equation for the right wheels by inverting the algebraic sign of the second summand on the right-hand side of this equation. This takes into account that acceleration in the y direction (therefore transverse to the direction of travel) acts inversely for the contact forces of the right wheels and the left wheels.

With a view to preventing a motor vehicle from rolling over (rollover protection), it is for example possible to use the sum of the wheel loads of the left wheels and/or the sum of the wheel loads of the right wheels and the extrapolation which has already been described can be carried out in each case. More particularly, it is for example possible to compare the sum of the wheel loads of the right wheels with the sum of the wheel loads of the right wheels. Because the corresponding equations can sometimes contain identical terms, it can suffice in specific applications and/or in specific driving situations to evaluate the terms with an inverted algebraic sign. Therefore, in these cases the comparison can be reduced to a calculation of the term or the terms, the algebraic sign of which has been inverted for both the right wheels and the left wheels. More particularly, in the case of this comparison a test can be carried out in order to determine whether or not a predetermined boundary value has been reached or exceeded. Should this be the case, a signal is for example output to a system in order to stabilize the motor vehicle while driving.

Fundamentals of the previously described model are the assumption of a rigid motor vehicle and the establishment of an angular momentum balance (or an equivalent balance) of the wheels considered in each case (for example the front wheels, the rear wheels or the left wheels). However, with such a model it is not possible to determine the wheel loads of individual wheels.

Especially where movements which are not to be ignored occur between the structure and the running gear it is nevertheless possible to determine the axle loads and/or the wheel loads with the measured values of the measuring device arranged in the structure (in particular with an IMU). To this end it is proposed that a motor vehicle model which takes into account the elasticity between the structure and the running gear of the motor vehicle be used.

In order to determine the individual wheel loads of a four-wheeled motor vehicle, the following approach is proposed in accordance with a second model: the introduction of an elasticity of the suspension between the wheels (i.e. a running gear) and a rigid vehicle structure. In addition, three degrees of freedom of the relative movement between the running gear and the vehicle structure are permitted in each case, namely a linear movement in the z direction (for example the movement of a point in the vehicle structure at which the measuring device takes measurements), a first rotation movement around a first rotational axis extending horizontally in the motor vehicle (in particular the x axis) and a second rotation movement around a second rotational axis extending horizontally in the motor vehicle (in particular the y axis), which extends transversally to the first rotational axis.

Figure 4:
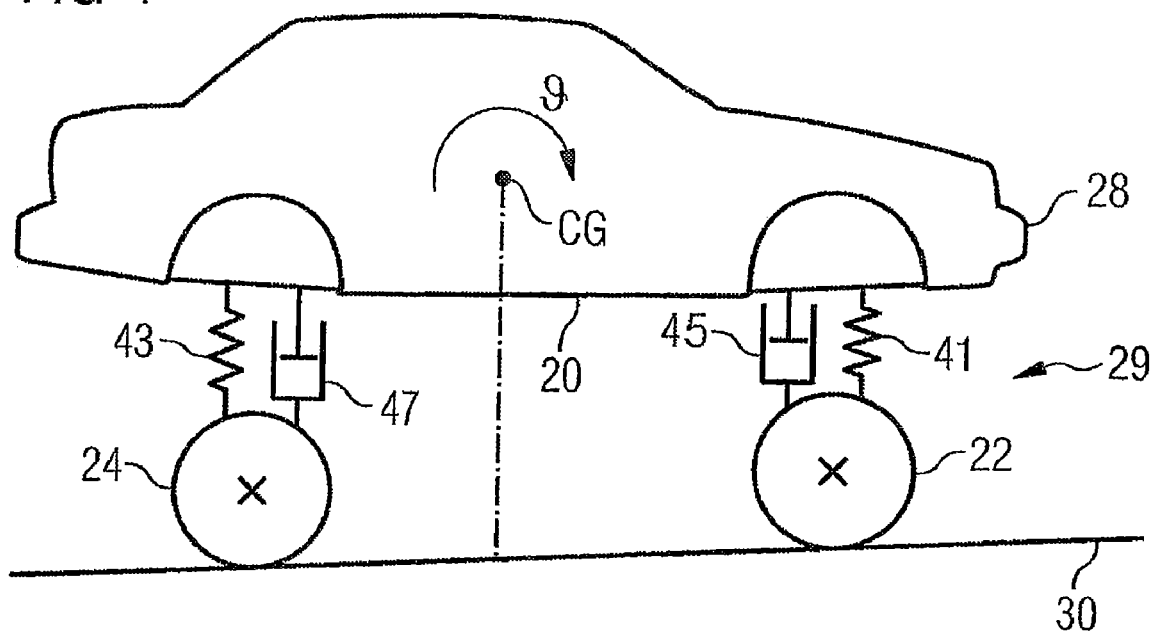
Figure 5:
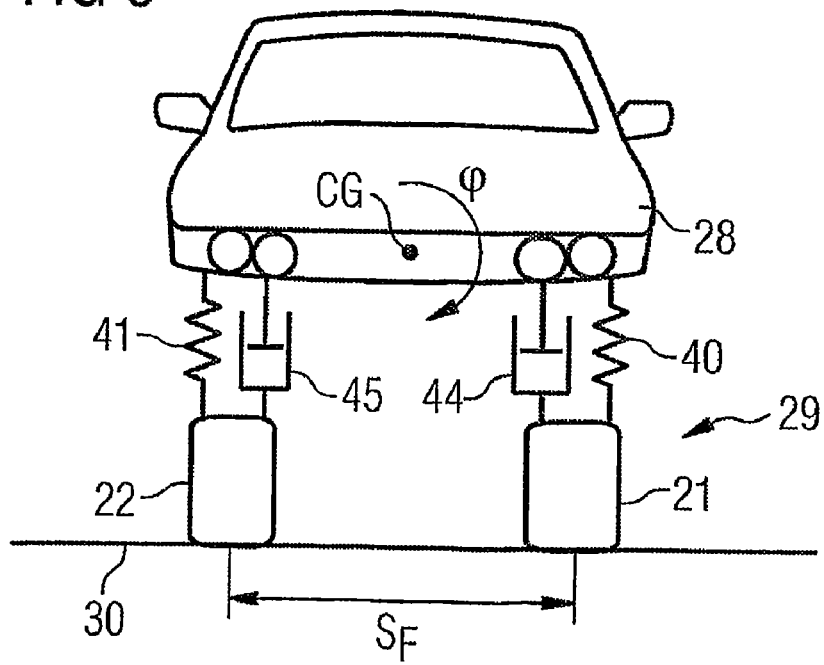

FIGS. 4 and 5 are a schematic representation of the model. A vehicle structure 28 has a center of gravity CG and is connected individually to the four wheels 21, 22, 23, 24 via springs 40, 41, 43 (in the two figures only three of the four wheels are shown) and via attenuators 44, 45, 47 acting parallel to the springs 40, 41, 43. Because the wheels 21, 22, 23, 24 are not directly connected mechanically with each other, it is also possible to make use of a five-mass model. The wheels 21, 22, 23, 24 are positioned on the subsurface 30 (for example on a road).

By forming the corresponding angular momentum balances (or equivalent balances, for example, torque balances) for the running gear, as has been described above for the rigid motor vehicle (i.e. two equations for two wheels in each case, for example, the front wheels and the rear wheels) and by taking into account the following differential equations $$\kappa_R \Delta\phi + \gamma_R \Delta\dot{\phi} = c_R a_y^{(e)} - \dot{\omega}_x$$

$$\kappa_P \Delta\theta + \gamma_P \Delta\dot{\theta} = -c_P a_x^{(e)} - \dot{\omega}_y$$

$$k\Delta z + \Gamma \Delta\dot{z} = -a_z^{(e)}$$

individual wheel loads can be calculated. In this case, $\kappa_R$, $\kappa_P$, k are parameters of the motor vehicle which correspond to a linear spring force of the specific movement component of the degree of freedom, $\gamma_R$, $\gamma_P$, $\Gamma$ parameters of the motor vehicle which correspond to a linear damping term of the specific movement component, $c_R$, $c_P$ additional parameters of the motor vehicle, $\Delta\phi$ the relative rotation angle between the vehicle structure and the running gear around the x axis (roll angle), $\Delta\theta$ the relative rotation angle between the vehicle structure and the running gear around the y axis (angle of pitch) and $a_j^{(e)}$, j=x,y,z the linear accelerations in the x direction, the y direction and the z direction measured by the measuring device arranged in the vehicle structure.

All the parameters can for example be determined experimentally and/or arithmetically for a specific motor vehicle or a specific type of motor vehicle.

A requirement of this model is the embodiment of the vehicle structure as a rigid body and in this way is in good approximation particularly suitable for the journey of motor vehicles on roads. This model takes into account the rolling motions and the pitching motions in the same way as has already been described and, as a result of this, is in particular suitable for driving situations and/or motor vehicles in which such movements or motions occur. This is especially the case for motor vehicles with a center of gravity of the vehicle structure positioned high above the running gear, for example, in the case of trucks and specific off-road vehicles.

In the case of the above-mentioned set of the three specified differential equations, the following changes can in particular be made or alternatives can be implemented:
  the springs can be described as non-linear springs,
  in one of the equations or in a plurality of the equations, more particularly in the equation for the angle of pitch $\Delta\theta$, a distribution of a brake force or of brake forces and/or of a driving force or of driving forces (for example in the case of four-wheel driven motor vehicles) over the wheels can also be taken into account and/or
  the equations can at least be partially coupled.

In order to simplify the calculation, it is possible to make simplifying assumptions, such as the following
  ignoring the mass of the running gear compared to the mass of the vehicle structure,
  the assumption that the measuring point at which the measuring device measures the rotation rates and the linear accelerations and/or through which the three rotational axes extend, is the center of gravity of the vehicle structure and/or
  the assumption that the difference in height (in the z direction) of the measuring point in the case of the four working points at which the spring forces act on suspensions in the vehicle structure operating between the wheels and the vehicle structure is equal in size for all four wheels.

In the model considered, a mathematical limit value formation can be undertaken, in which case it is possible for the spring forces to reach infinity (borderline case of rigid springs). In the above-mentioned differential equations, said model corresponds to the case $\kappa_R, \kappa_P, k \to \infty$. The following calculation equations are obtained for the individual wheel loads:

$$F_{FL/R,z} = \frac{l_R}{2(l_F + l_R)} m_V a_{CG,z}^{(e)} -$$

$$\frac{1}{2(l_F + l_R)}(h_{CG} m_V a_{CG,x}^{(e)} + J_{CG,y}) \mp \frac{l_R}{s_F(l_F + l_R)}(h_{CG} m_V a_{CG,y}^{(e)} - J_{CG,x})$$

$$F_{RL/R,z} = \frac{l_F}{2(l_F + l_R)} m_V a_{CG,z}^{(e)} +$$

$$\frac{1}{2(l_F + l_R)}(h_{CG} m_V a_{CG,y}^{(e)} - J_{CG,y}) \mp \frac{l_F}{s_F(l_F + l_R)}(h_{CG} m_V a_{CG,y}^{(e)} - J_{CG,x})$$

in which case the minus sign in the operator $\mp$ of the equations refers to the left wheel in each case and the plus sign to the right wheel in each case.

More particularly, this simplified model is suitable for motor vehicles with a low-positioned center of gravity of the vehicle structure, for traveling on a level subsurface (as opposed to poor road sections) and for traveling at high speeds. For example, in the case of a specific embodiment it can be determined whether or not one of these conditions actually occurs. Should this be the case, the computation unit returns to the simplified model. Otherwise, the basic model which takes account of the suspension is used.

What is claimed is:
1. An arrangement for the determination of the dynamic axle loads and/or the wheel loads of a wheel vehicle, comprising:
  a measuring device arranged in the wheel vehicle or which can be arranged in the wheel vehicle, wherein said measuring device being operable to measure at least two linear accelerations of a wheel vehicle oriented transversally with respect to each other and to measure three rotation rates of a rotation movement or of a component of a rotation movement around a coordinate axis of the wheel vehicle, respectively, wherein said three coordinate axes extend transversally with respect to each other, and
  an evaluation device, coupled with the measuring device and operable to determine at least one axle load and/or one wheel load by means of the at least two linear accelerations and the three rotation rates.

2. An arrangement according to claim 1, wherein the measuring device has acceleration sensors in order to measure the linear accelerations and rotation rate sensors to measure the three rotation rates, wherein said acceleration sensors and the rotation rate sensors are parts of a prefabricated unit embodied in accordance with equipment engineering so that they can be installed in the wheel vehicle.

3. An arrangement according to claim 1, wherein the measuring device is operable to measure the at least two linear accelerations as linear measured quantities, which do not depend on each other.

4. An arrangement according to claim 1, wherein the measuring device has been embodied in such a way that the three coordinate axes extend vertically with respect to each other in pairs.

5. An arrangement according to claim 1, wherein in order to measure the rotation rates and to measure the linear accelerations, the measuring sensors of the measuring device are fitted to a vehicle structure moving relative to a running gear of the motor vehicle.

6. An arrangement according to claim 1, wherein the evaluation device has a computation unit, which is operable to calculate, by using a measured value measured by the measuring device for a linear acceleration oriented transversally to the plane of a vehicle subsurface, at least one part of the axle load and/or a part of the wheel load.

7. An arrangement according to claim 1, wherein the evaluation device has a computation unit, which is operable to calculate, by using the three rotation rates, at least one part of the axle load and/or a part of the wheel load, which is generated by a rotation movement of the wheel vehicle and/or by a rotation movement of a part of the wheel vehicle.

8. An arrangement according to claim 1, wherein the evaluation device has a computation unit, which is operable to calculate the axle load and/or the wheel load, with due consideration of a, in particular damped, suspension (40, 41, 43) between at least one of the wheels (21, 22, 23, 24) of the wheel vehicle and a vehicle structure.

9. A method for the determination of the dynamic axle loads and/or the wheel loads of a wheel vehicle, the method comprising the steps of:
measuring in the wheel vehicle at least two linear accelerations of a wheel vehicle oriented transversally with respect to each other and three rotation rates of a rotation movement or of a component of a rotation movement around a coordinate axis of the wheel vehicle, respectively, wherein said three coordinate axes extend transversally with respect to each, and
determining at least one axle load and/or one wheel load of the wheel vehicle, by using the at least two linear accelerations and three rotation rates.

10. A method according to claim 9, wherein the linear accelerations are measured with acceleration sensors and the rotation rates with rotation rate sensors and wherein said acceleration sensors and the rotation rate sensors are parts of a prefabricated unit embodied in accordance with equipment engineering so that they can be installed in the wheel vehicle.

11. A method according to claim 9, wherein the at least two linear accelerations are measured as linear measured quantities, which do not depend on each other.

12. A method according to claim 9, wherein the three coordinate axes extend vertically with respect to each other in pairs.

13. A method according to claim 9, wherein the rotation rates and the linear accelerations are measured as rotation rates and linear accelerations of a vehicle structure moving relative to a running gear of the motor vehicle.

14. A method according to claim 9, wherein, by using a measured value measured in the wheel vehicle for a linear acceleration oriented transversally to the plane of a vehicle subsurface, at least one part of the axle load and/or a part of the wheel load is calculated.

15. A method according to claim 9, wherein, by using the three rotation rates, at least one part of the axle load and/or a part of the wheel load is calculated, which is generated by a rotation movement of the wheel vehicle and/or by a rotation movement of a part of the wheel vehicle.

16. A method according to claim 9, wherein, with due consideration of a, in particular damped, suspension between at least one of the wheels of the wheel vehicle and a vehicle structure, the axle load and/or the wheel load is calculated.

17. A method according to claim 9, further comprising the step of forecasting whether or not a wheel of the wheel vehicle or a plurality of wheels of the wheel vehicle will lose roadholding and thus the grip to a subsurface, by using the calculated at least two axle loads and/or wheel loads.

18. An arrangement for the determination of the dynamic axle loads and/or the wheel loads of a vehicle, comprising:
a measuring device arranged in the center of the vehicle comprising:
at least two linear acceleration sensors oriented transversally with respect to each other, and
three rotation rate sensors for measuring of a rotation movement or of a component of a rotation movement around a coordinate axis of the vehicle, wherein said three coordinate axes extend transversally with respect to each other, and
an evaluation device coupled with the measuring device for determining at least one axle load and/or one wheel load by the at least two linear accelerations and the three rotation rates.

19. An arrangement according to claim 18, wherein the measuring device is arranged in the proximity of the center of gravity of a wheel vehicle.

20. An arrangement according to claim 18, wherein the measuring device is operable to measure the at least two linear accelerations as linear measured quantities, which do not depend on each other.

* * * * *